March 3, 1970 K. M. DICKIE 3,497,911
BALLING DRUM AND ROTARY WALL TRIMMER THEREFOR
Filed March 6, 1968 2 Sheets-Sheet 1
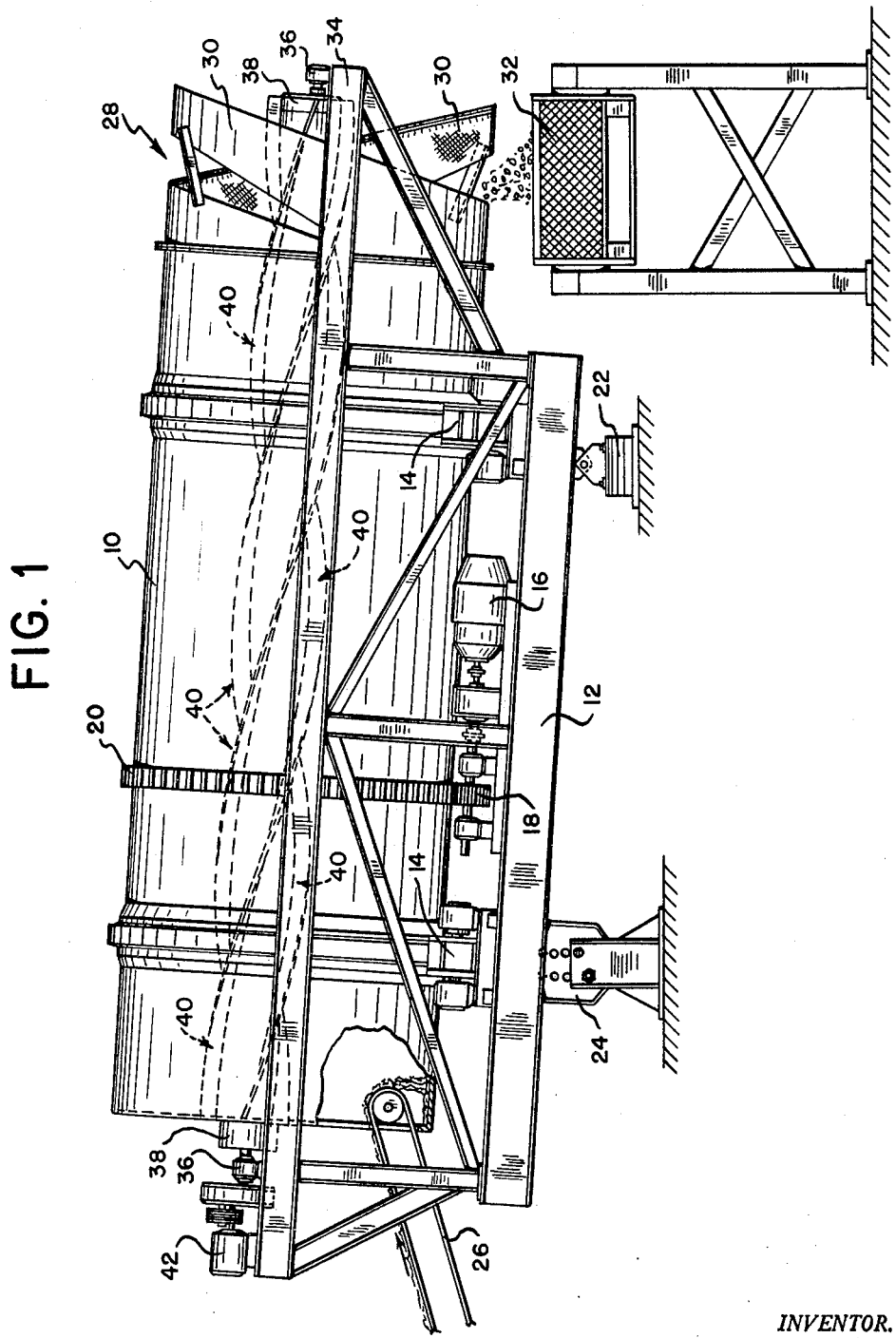
INVENTOR.
Kenneth M. Dickie
BY
ATTORNEYS March 3, 1970      K. M. DICKIE      3,497,911
BALLING DRUM AND ROTARY WALL TRIMMER THEREFOR
Filed March 6, 1968      2 Sheets-Sheet 2
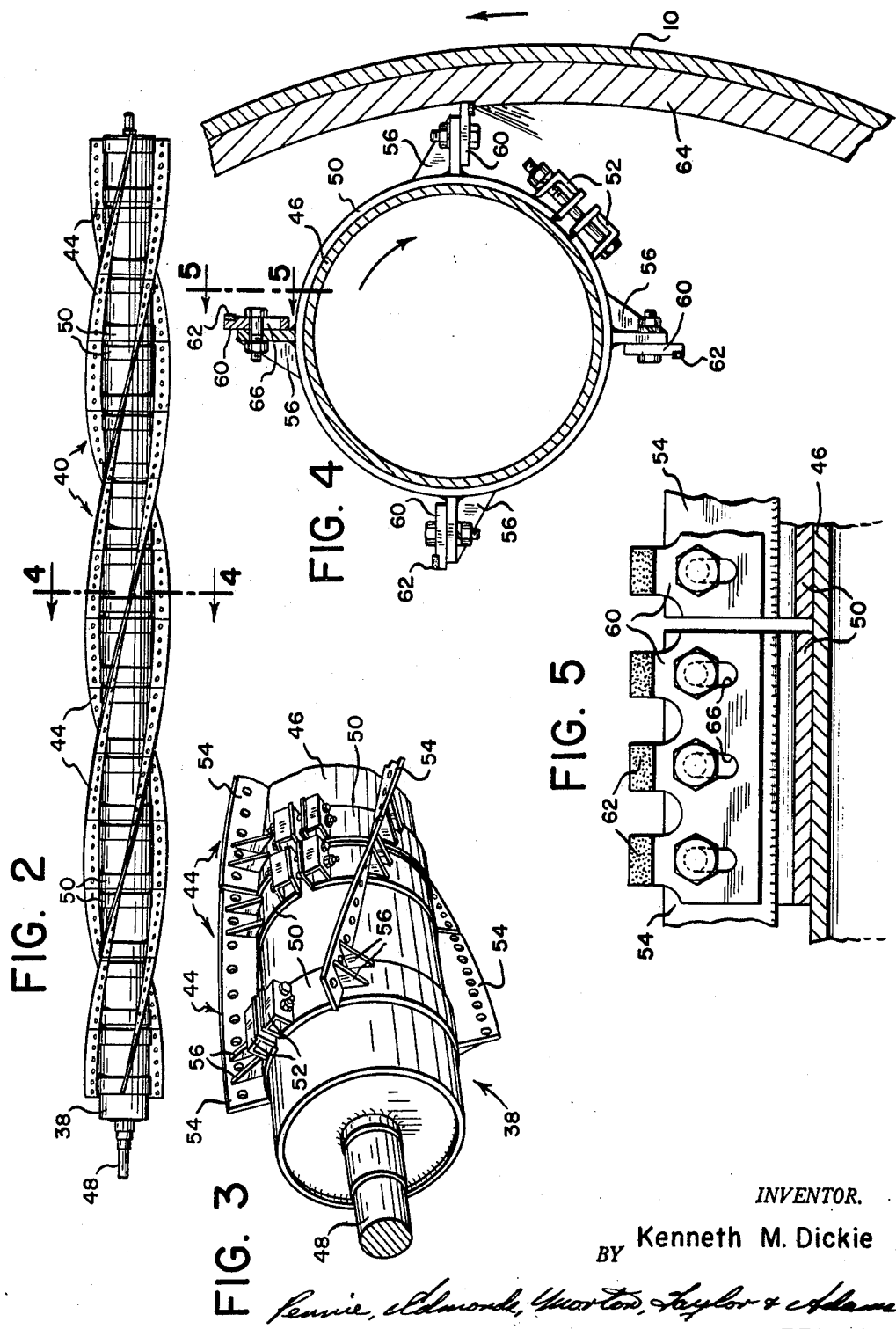
INVENTOR.
Kenneth M. Dickie
BY
ATTORNEYS

United States Patent Office 3,497,911
Patented Mar. 3, 1970

3,497,911
BALLING DRUM AND ROTARY WALL
TRIMMER THEREFOR
Kenneth M. Dickie, Bloomsburg, Pa., assignor to Kennedy
Van Saun Corporation, Danville, Pa., a corporation of
Delaware
Filed Mar. 6, 1968, Ser. No. 711,051
Int. Cl. B29b 1/02
U.S. Cl. 18—1                              6 Claims

ABSTRACT OF THE DISCLOSURE

A rotatable balling drum for pelletizing finely-divided solid materials such as ores and other fines, including a rotatable balling drum provided with a rotatable helical vane type trimmer or scraper bar on the interior of the drum, wherein the bar comprises a rotatable shaft carrying a series of similar trimmer or scraper units each removably attached to the shaft and each comprising a pair of spaced clamping bands carrying a plurality of helical scraper vane segments. When the series of units are assembled on the shaft, the vane segments of one unit constitute continuations of the respective vane segments of an adjacent unit on the shaft, thereby providing helical vanes extending along the effective trimming length of the shaft.

BACKGROUND OF THE INVENTION

Field of the invention

The invention of this application relates to improvements in rotatable balling drums of the type used for pelletizing fine solid materials such as ores, and more particularly to an improved rotatable spiral vaned scraper or trimmer bar for regulating the thickness and uniformity of the coating of material lining the rotatable drum.

Description of prior art

Balling drums are now in use in various arts for pelletizing fine materials of the type of ores, cements, carbon black, industrial dusts, solid chemicals and other solid fines. The pelletizing of such materials make them more readily handled or processed than are the original fines.

Balling or pelletizing drums provided with internal scraper bars are now in use in a number of arts and such apparatus has been the subject of a number of patents. Particular reference is here made to the U.S. patents to Yesberger et al. No. 2,728,940, De Vaney No. 2,947,026, and Kallberg No. 3,316,585.

The Yesberger patent discloses a balling apparatus and process, the apparatus including a rotatable cylindrical balling drum and a pair of helical vaned scrapers extending through the drum for scraping its inner wall for the removal of deposits adhering thereto. Means are provided for adjusting the scrapers with respect to the wall of the drum.

The De Vaney patent discloses a pelletizing apparatus comprising an inclined hollow conically-shaped rotatable drum and a wall scraping device as shown in FIG. 9 comprising a rotatable helical screw which is rotated independently of the rotation of the drum.

The Kallberg apparatus differs from that of Yesberger by including a single scraper shaft to which helical flanges are welded carrying detachable scrapers.

The present invention relates particularly to an improvement in the spiral scraper or trimmer. In apparatus employing rotating helical screw type scrapers or trimmers considerable difficulty has been encountered in providing a relatively long rotatable scraper bar which will be sufficiently rigid to uniformly scrape or trim the material adhering to the inside of the rotatable balling drum.

In general the helical vanes of such scraper bars are welded directly to a longitudinal shaft extending through the rotatable drum, so that it is extremely difficult to provide vanes that will uniformly trim the material from the interior of the drum without wearing unevenly or breaking.

If a known type of scraper vane is bent or broken its repair or replacement is extremely difficult without removing the scraper bar from the balling drum. Furthermore, when the scraper bar is of considerable length, the replacement or repair may be very extensive as well as costly. Even the initial manufacture of a long vane and its welding to the scraper bar proper presents a further problem.

The present invention solves the problems and avoids the difficulties referred to above in connection with initially constructing the scraper bar and replacing bent or broken scraper vanes.

BRIEF SUMMARY OF INVENTION

The invention of this application comprises an improved rotatable scraper or trimmer bar for rotatable balling drums including an elongated shaft, a series of similar scraper units mounted along the shaft and removably attached thereto. Each unit carries a plurality of circumferentially spaced scrapers extending in the general direction of the shaft.

In this structure each unit includes a band extending around the shaft and each scraper carried by the band includes an elongated support member attached to the band and a scraper blade adjustably attached to the support member. More specifically, the support members of each unit are helical segments attached in parallel relationship to a pair of spaced clamping bands and the units are arranged on the shaft so that each helical segment constitutes a continuation of an adjacent helical segment of an adjacent unit, whereby a plurality of helical vanes are provided extending along and around the shaft.

BRIEF DESCRIPTION OF THE DRAWINGS

The drawings forming a part of this application illustrate the features of the invention in connection with a single embodiment.

In the drawings:

FIG. 1 is a side elevational view of a balling drum for producing pellets of moistened finely-divided solid materials, such as ores, provided with a rotatable trimmer bar according to the features of the present invention;

FIG. 2 is a side elevational view of the trimmer bar according to the invention, removed from the drum;

FIG. 3 is an enlarged broken perspective view of the left-hand end portion of the trimmer bar shown in FIG. 2;

FIG. 4 is an enlarged cross-sectional view taken on the line 4—4 of FIG. 2, but also showing the relationship between the trimmer bar and the side wall of the balling drum, shown broken away; and FIG. 5 is an enlarged broken detail view taken on the line 5—5 of FIG. 4.

DETAILED DESCRIPTION OF PREFERRED EMBODIMENT

The general arrangement of the balling drum is illustrated in FIG. 1 wherein the apparatus comprises an elongated inclined rotatable drum 10 mounted in the usual way on a base frame 12 by means of roller units 14 carried by the frame. The drum 10 is rotated by a motor 16 driving a gear 18 which meshes with a gear band 20 attached to the periphery of the drum. The base frame 12 is pivoted on adjustable blocks 22 at the outlet end and by adjustable support means 24 at the forward end of the drum. The material to be pelletized is conveyed into the inlet of the drum by conventional conveyor belt 26 and the pellets are discharged over a spreader 28 at the outlet end of the drum. As the pellets reach the spreader 28, they move outwardly along the tongues 30 and fall off the edges of these tongues as the drum rotates, so that the pellets are more or less evenly distributed across a travelling screen belt 32.

The framing shown in FIG. 1 comprises a medial longitudinal beam 34 on each side of the drum supported on the base frame 12. These beams are provided at the ends of the drum with cross members supporting bearings 36 in which are mounted the spindles of a rotatable scraper bar 38 carrying a series of scraper units providing a plurality of helically extending scraper vanes 40 shown diagrammatically in dotted lines in FIG. 1. The scraper bar 38, as illustrated, is rotated by a motor 42 through a gear reducer. The bar 38 extends as shown through the spreader 28 for removing any pellets which may adhere to the interior surface of this spreader.

In practicing a pelletizing operation, the material supplied by the conveyor 26 may be dampened or wetted to the desired extent. Some ores and dusts are advantageously wetted in a mixer, passed through a crusher to reduce any lumps then distributed into the balling drum. In other cases, the finely-divided ore or other material may be delivered from storage or dumps by the conveyor 26 directly into the inlet of the balling drum, wherein it may be sprayed with moisture to the desired extent, well known in the art, so that effective and desirable agglomeration is achieved.

In a pelletizing operation carried on in a rotatable drum, the moisturized fine material adheres to the inner surface of the drum, and it is the primary function of the scraper or trimmer bar 38 to trim off a certain amount of wet material from the inner surface of the drum and leave a substantially uniform coating of the damp and agglomerated material on the inner surface of the drum. The wet material removed by the scraper vanes 40 falls back into the drum and is rolled into balls or pellets as it mixes with the material introduced into the drum by the conveyor 26.

The present invention is primarily concerned with the structural features of the scraper bar, the details of which are shown in FIGS. 2 to 5. According to the invention the helical vanes 40 of the scraper bar are provided by a series of similar scraper units 44 mounted adjacent to each other along the effective length of the scraper bar 38 in the balling drum. In FIG. 2, fourteen such units are shown, each of which is individually and readily installed. They are also readily removable from the scraper bar 38.

The detailed structure of each unit 44 is shown in FIGS. 3 and 4. These units are advantageously mounted on a shaft, such as the elongated steel cylinder 46, the ends of which are provided with spindles carried in the bearings 36, for example, the spindle 48 shown in FIG. 3, which is connected into the drive of motor 42. This figure shows the first scraper unit and a part of the second scraper unit. All units are similar and the first unit as here shown comprises a pair of spaced steel bands 50 having spaced ends each provided with a flange structure 52 so that the ends of the bands may be drawn toward each other and thereby clamped onto the cylinder 46.

The bands 50 of each scraper unit carry similar helical vane segments 54 advantageously welded to the bands 50 and supported by welded-in-place brackets 56 for supporting the segments 54, against damage during rotation, the segments 56 being mounted at the back of the segments, relative to the direction of rotation of the scraper bar 38. FIGS. 2 and 3 show that the helical vane segments 54 are all of similar structure and similarly spaced on all of the units 44. Furthermore, these units are arranged, so that the respective segments 54 of each unit 44 constitute continuations of the segments 54 of the adjacent unit to advantageously provide a plurality of long helical vanes 40 extending along the scraper bar 38, as shown in FIG. 2. In the drawings, each of the scraper units 44 is illustrated as comprising two spaced steel bands 50 and four helical vane segments 54. Each unit 44 is clamped to the cylindrical shaft 46 and fixed thereon in the required position by the tightening of the bolts extending through adjacent flange members 52 of each band 50.

The helical segments 54 comprise scraper supports for trimmer elements and each is provided with a series of bolt holes extending therealong, as shown in FIGS. 3 and 4, for the attachment of scraper or trimmer elements or plates 60. The helical segments 54 carrying the plates or blades 60 of each unit 44 may be staggered circumferentially with respect to the segments of an adjacent unit. Each trimmer plate 60, as shown in FIG. 5 is provided with three projecting trimmer teeth, each carrying a rectangular-shaped wear-resistant facing member 62 of silicon carbide. The silicon carbide members face in the direction of rotation of the trimmer bar 38, and, as shown in FIG. 4, these members engage the surface portion of a layer 64 of material adhered to the inner surface of the drum 10.

Each vane segment 54, as indicated in FIG. 3, is provided with holes for mounting three of the trimmer plates 60, and each plate is provided with slots 66 for retaining bolts which extend through the holes in the segments 54. The slots are provided so that a plate 60 may be set in place on the segment 54 the desired distance from the inner surface of the drum 10. The slots 66 also provide means by which the plates 60 may be adjusted along the entire length of the series of segments 54 comprising any one of the four helical vanes shown in the drawings.

It will be understood that since the scraper or trimmer teeth of the plates 60 are spaced apart, the cut made by the scraper members 62 will leave uncut portions of the layer 64, but these portions will be cut off by the members 62 of other helical vanes, since the helical arrangement of the vanes and the staggering of the plates 60 is such that a substantially uniform cut may be made entirely along the layer 64, or a layer of substantially uniform thickness maintained on the inside of the drum 10. In this connection it will be understood that the plates 60 may be arranged in staggered relation along different vane segments, and, if necessary, one plate may be attached to adjacent helical segments 54. Preferably, however, the plates 60 do not extend to adjacent vanes, but if necessary, plates may be made carrying from three to five teeth and scraper members 62. In any case, the scraper members 62 are preferably arranged on the four helical segments 54 of each unit, so that there is complete longitudinal coverage opposite that unit along the inside surface of the drum.

In the operation of the pelletizing apparatus as shown in FIGS. 1 and 4, the rotation of the drum 10 is indicated by the upwardly-pointing arrow in FIG. 4, while the rotation of the scraper bar, located adjacent to the drum, is rotated in the opposite direction as indicated by the arrow inside the cylinder 46.

While the individual scraper units 44 provided with the flange members 52 are readily movable and adjustable around and along the cylinder 46, the removal of an individual unit is facilitated by providing each of the bands 50 of a unit with a hinge connection opposite the flanges, so that when the flange bolts are released from one side, the hinge pins may also be removed and thereby permit ready removal of both halves of a given unit 44. For the most part, however, it is not necessary to provide this hinge arrangement for purposes of installation, adjustment and most repairs.

In the described embodiment each unit comprises two attachment bands 50. More than two bands may be used or a single wide band depending on the length of the units. Furthermore, other attachment means may be provided, but an important feature of the invention is to attach the cutter segments to the tubular or cylindrical shaft 46 without breaking the continuity of its wall, or using welding along its span, either of which would cause structural weakening and breaking.

What is claimed is:

1. In a rotatable scraper or trimmer bar for elongated rotatable balling drums of the type in which a scraper bar extends along inside the drum adjacent its inside surface, the scraper bar including an elongated rotatable shaft provided therealong with laterally projecting scraping means for scraping agglomerated finely divided material from the inner surface of agglomerated material on the inner surface of the rotatable drum, wherein the improvement comprises scraping means mounted on the rotatable shaft consisting of a series of similar scraper units mounted one directly after the other along the shaft, each scraper unit including similar spaced clamping members for individually, independently and readily attaching such scraper unit to the shaft and for detaching it from the shaft, each scraper unit including a plurality of circumferentially-spaced laterally projecting scrapers each attached to said clamping members and extending in the general direction of the axis of the shaft.

2. A scraper bar as claimed in claim 1, wherein each clamping member comprises a clamping band extending around the shaft.

3. A scraper bar as claimed in claim 2, wherein each scraper of each scraper unit comprises an outwardly-projecting helical vane segment fixed to the clamping bands of the unit.

4. A scraper bar as claimed in claim 1, wherein each clamping member is a band having spaced ends, and means for drawing said ends toward each other to thereby tighten the band on the shaft.

5. A scraper bar as claimed in claim 1, wherein each scraper of each unit comprises an outwardly-projecting helical vane segment attached to the clamping members of said unit.

6. A rotatable scraper bar as claimed in claim 1, wherein the shaft is a tubular structure the span of which in the rotatable drum is free of welding and attaching means which would break the continuity of the wall of the tubular shaft and cause structural weakening.

References Cited

UNITED STATES PATENTS

| 1,570,086 | 1/1926 | Schaffer | 18—1 |
| 2,466,492 | 4/1949 | Sizer. | |
| 2,518,124 | 8/1950 | Corbett. | |
| 2,728,940 | 1/1956 | Yesberger et al. | 18—1 |
| 2,778,056 | 1/1957 | Wynne | 18—1 XR |
| 3,316,585 | 5/1967 | Kallberg | 18—1 |
| 3,382,538 | 5/1968 | Burner | 18—12 |

WILLIAM J. STEPHENSON, Primary Examiner